United States Patent [19]

Larsson

[11] 3,852,598

[45] Dec. 3, 1974

[54] SCINTILLATION CAMERA WITH IMPROVED RESOLUTION

[76] Inventor: Agne Larsson, Barytongatan 13, 421 38 Vastra Frolunda, Sweden

[22] Filed: Nov. 21, 1972

[21] Appl. No.: 308,539

[30] Foreign Application Priority Data
Nov. 23, 1971 Sweden.............................. 14953/71

[52] U.S. Cl.................. 250/327, 250/369, 250/505
[51] Int. Cl............................................... G01t 1/20
[58] Field of Search ........... 250/327, 366, 368, 369, 250/393, 482, 505

[56] References Cited
UNITED STATES PATENTS

3,320,418  5/1967  Steel .................................. 250/327
3,418,471  12/1968  Gydesen .......................... 250/369
3,631,244  12/1971  Bergstedt........................... 250/327

Primary Examiner—Archie R. Borchelt
Attorney, Agent, or Firm—Walter C. Ramm; Charles H. Thomas, Jr.; Peter J. Sgarbossa

[57] ABSTRACT

A scintillation camera with a multichannel collimator and an optical or electronic demodulator operating on the spatial coordinate output of the camera to produce a mirror image reversal of outputs associated with radiation quanta traversing individual channels of said collimator, the mirror image reversal being produced with respect to a central axis of each collimator channel.

6 Claims, 7 Drawing Figures

SCINTILLATION CAMERA WITH IMPROVED RESOLUTION

The present invention deals with a camera-type system for the detection, registration and documentation of ionizing radiation, hereinafter called radiation quanta. These camera-type systems can have various designs with the main variations being in the type of detector or transducer which is utilized. The most commonly employed transducer is a scintillation crystal and thus the camera-type system will hereinafter be referred to as a scintillation camera. A scintillation camera system useful for this invention will also be provided with a multichannel collimator. Multichannel collimators are constructed of a material with a high absorption for the radiation quanta to be detected and contain a number of parallel, diverging, or converging channels which the radiation quanta traverse to reach the detecting transducer without being absorbed.

Scintillation cameras are used primarily in medicine when the distribution of radionuclides in a human organ is to be mapped. In this application, it is attempted to make the radionuclide mapping as detailed as possible. The sharpness in detail in mapping the radionuclide distribution in or around the organ is determined by the resolution of the collimator, through which travel only those radiation quanta which are incident within a limited solid angle on a limited part of the detector transducer, together with the combined resolution of the detector, display, recording, and documentation system.

In the detection of radiation quanta of a particular energy by a scintillation camera with a multichannel collimator, it is possible to optimize the resolution of the collimator with respect to the sensitivity of the detecting transducer. The collimator resolution, i.e. its capability to distinguish, for example, two separated point sources of radiation, and its sensitivity, i.e. the degree to which incident radiation quanta reach the detector, are dependent on each other. According to current theory concerning the relationship between these parameters, the collimator can be dimensioned to have good resolution at low sensitivity or vice versa. A collimator's resolution is dependent upon the size of the cross section of the channel which the radiation quanta traverse in reaching the detector. The collimator resolution is also dependent upon the length of the collimator channel as well as the distance between the exit face of the collimator and detector and between the entrance face of the collimator and the radiation source.

A quantum of radiation traversing a collimator channel has a particular probability of interacting with the detecting transducer. In the transducer the energy of the radiation quantum is converted into a different form of energy which produces an output signal in the recording system which carries information concerning the coordinate location of the interaction in the transducer. The signal carrying position information, possibly after amplification, data processing and data storage, produces an image on a display device, for example, a brief light spot on a cathode ray tube, showing where the radiation quanta interacted with the transducer. Image information in a display device can be subjected to data processing before display and documentation or can be documented directly from a display device to a documentation device such as photographic film. However, the detector itself can comprise several devices, in accordance with this invention, which together constitute the detector, recording and display system.

To accomplish a perfect mapping of a radionuclide distribution in a human organ, the combined resolution of the collimator, detector, recording and documentation system would have to be ideal.

If the collimator resolution is to be ideal, i.e. such that two very small radiation sources located in front of the collimators and very close to each other will be imaged in a resolved manner in the documentation system (on the assumption that the other parts of the system have ideal resolution) the cross section of the channel would, among other things, have to be very small while its length would have to be very great. The radiation quanta which are emitted from a radioactive point source located in front of the collimator and interacting in the detecting transducer have only a single path through the collimator channels if the collimator has ideal resolution. The radiation quanta interacting in the detector therefore carry information that they originate from a radiation source located on a straight line from an interaction point in the detector and travelling coaxially through the collimator channel, i.e. the channel traversed by the radiation quanta in reaching the point of interaction. This can also be expressed in terms that the radiation quanta from a particular point source can reach an interaction point in the detector only through one collimator channel.

For the reasons noted above, however, it is not possible to use a collimator like this in practice. In other words, for the collimator sensitivity to be such that mapping becomes possible in a tolerable examination period, the size of the cross section of collimator channels cannot be very small, i.e. less than 1mm, and the length of the channels cannot be very great, i.e. greater than 20 cm.

A larger cross section produces the result that the radiation quanta emitted from a radioactive point-source located in front of the collimator and interacting in the detector do not necessarily have to pass only through one channel in the collimator. This has the result that the collimator resolution deteriorates, i.e. it is not ideal.

This invention is characterized in that the image-deteriorating effect produced by the non-ideality of the collimator resolution is partly eliminated without significantly reducing the collimator sensitivity. This is achieved by employing an optical or electronic correction device, hereinafter called a demodulator. This demodulator, if it is an optical one, can be placed between the detector's display system and a documentation system. An optical demodulator can also be placed between the completed document, for example, photographic film, and a redisplay or redocumentation system, and thus does not need to be an integral unit of the scintillation camera. If the demodulator is electronic, it can be placed into the registration system and there can be considered to process the detector output signals carrying position information before they are fed to the display system.

The demodulator can be considered to consist of a number of demodulator elements, one element for each collimator channel, where each element produces the mirror-image of the information-carrying signal from a corresponding collimator channel before documentation or redisplay. Each element has a position corresponding to that of its associated collimator channel, and in an application in which the collimator is moved, the demodulator is given a synchronized movement with the collimator. With a knowledge of the parameters of the collimator and the characteristics of the detection apparatus, the demodulator can be constructed such that a particular degree of improvement of the resolving power of the overall system is obtained.

The mirror-imaging elements of the demodulator can consist of a channel in an opaque disk. This channel therefore functions like a camera pinhole. A lens or lens system can produce the same result as the above-cited channel.

Since each element in the demodulator forms a mirror-image of information-carrying signals from each associated collimator channel, the resultant signal will be documented closer to the location it would have been documented if the collimator resolution were ideal, i.e. the image-deteriorating effect which is produced by the fact that the radiation quanta emitted from one and the same point-shaped radioactive source reach the detector through more than one channel is partially eliminated.

A publication describing in detail a camera type system for the detection, registration and documentation of radiation quanta is:

Anger, H. O., "Radioisotope Cameras", *Instrumentation in Nuclear Medicine*, Chapter 19, edited by G. J. Hine, Academic Press, N.Y., 1967.

Particular features and advantages of this invention will be apparent from a consideration of the following detailed description in conjunction with the accompanying drawings which are briefly described as follows.

Figure 1:
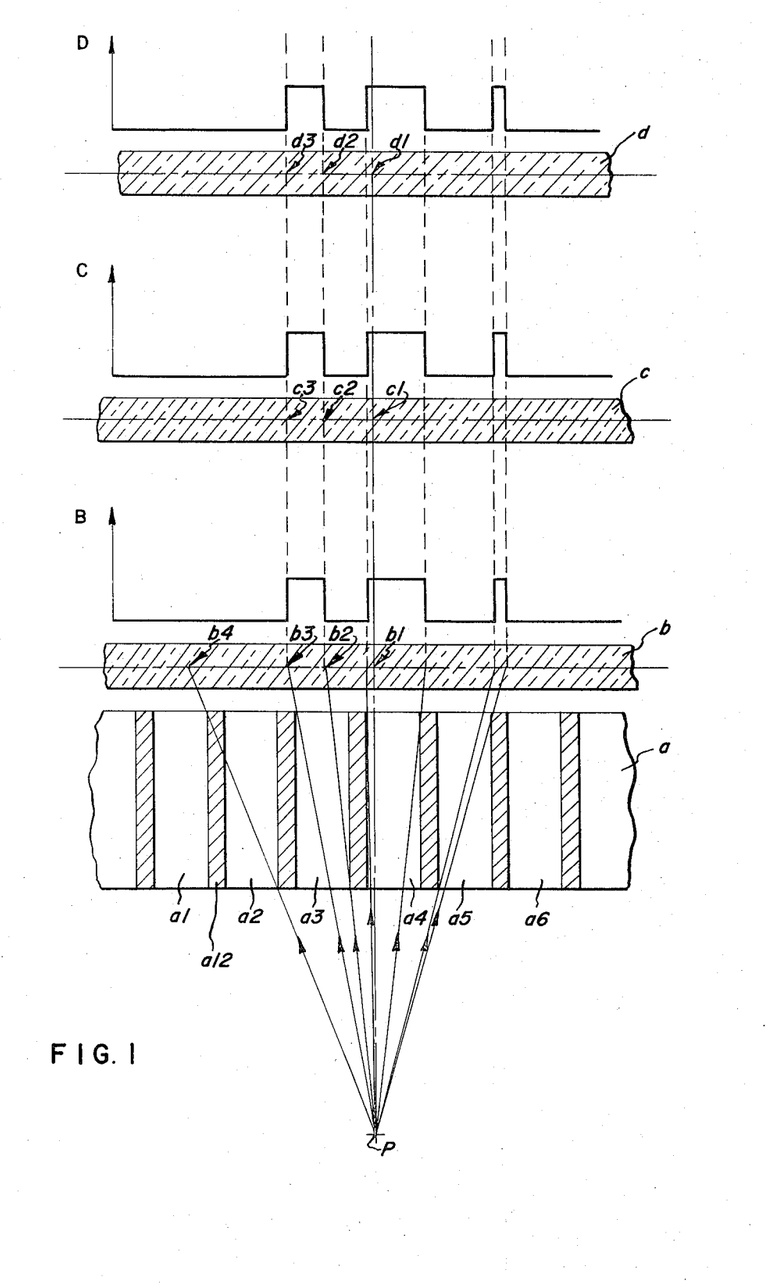
FIG. 1 is a schematic representation of portions of a scintillation camera in cross section together with graphical representations of system response.

FIG. 1 shows schematically in cross section the relationships between a multichannel collimator $a$, detector $b$, registration system $c$ and documentation system $d$, and the detected intensity B in detector B, recorded intensity C in the registration system $c$ and the documented intensity D in the documentation system $d$ in the detection, registration, and documentation of radioactive radiation from a point-shaped radioactive source $p$ with, for example, a scintillation camera. The quanta of radiation which are emitted from source $p$ can travel to the detector $b$ only through channels $a3$, $a4$ and $a5$ in multichannel collimator $a$. The quanta which are emitted from source $p$ toward point $b4$ in the detector $b$ are absorbed in wall $a12$ between channel $a1$ and channel $a2$ and thus will not be detected. The quanta from source $p$ which pass through channel $a3$ in collimator $a$ are detected between points $b3$ and $b2$ in detector $b$ and the detected intensity B thus is increased in the region between points $c3$ and $c2$ in the registration system $c$ and at the same time, the documented intensity D is increased between points $d3$ and $d2$ in the documentation system $d$. In the registration system $c$ and documentation system $d$ a conical image of the quanta detected in detector $b$ is formed. In order to facilitate understanding of the invention, it is assumed that detector $b$ has ideal resolution. If the collimator resolution were ideal only the quanta which are emitted from source $p$ to point $b1$ in detector $b$ would be detected and thus registered at point $c1$ of the registration system $c$ as well as documented in point $d1$ of the documentation system $d$. The registration and display as well as documentation of one particular detector signal may differ in time.

Figure 2:
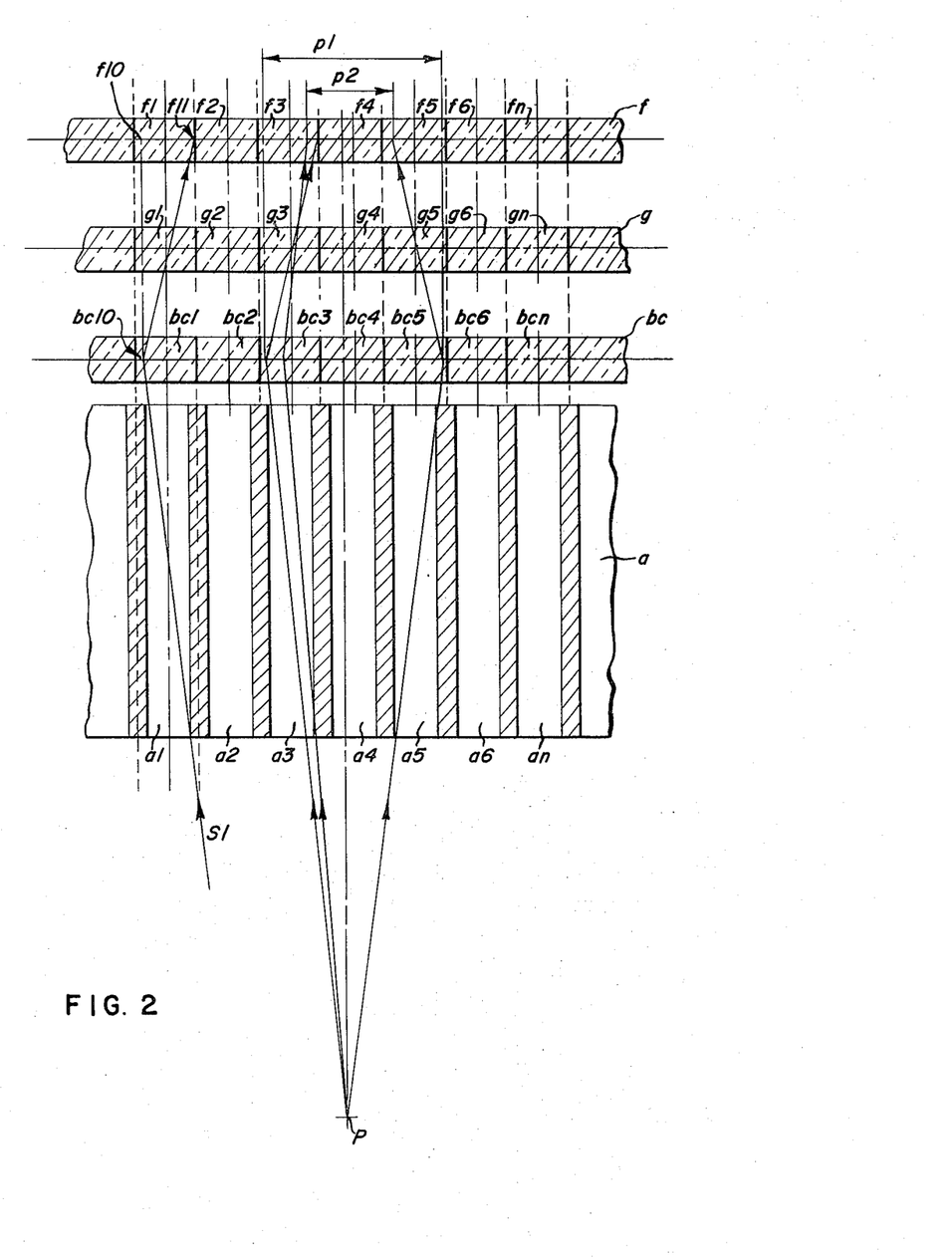
FIG. 2 is a schematic representation in cross section of portions of a scintillation camera and a generalized demodulator according to this invention.

As shown in FIG. 2, the invention is characterized by the fact that a correction system, called demodulator $g$, is placed between the detector $bc$, which by itself or possibly after amplification and recording, constitutes a display system. Demodulator $g$ consists of a number of elements $g1$, $g2$, $g3$, $g4$, $g5$, $g6$ and $gn$ spaced from each other and operatively associated with certain zones $bc1$, $bc2$, $bc3$, $bc4$, $bc5$, $bc6$ and $bcn$ in detector $bc$ and zones $f1$, $f2$, $f3$, $f4$, $f5$, $f6$ and $fn$ on screen $f$. Each zone $bc1$–$bcn$ in detector $bc$ is operatively associated with the respective channels $a1$–$an$ in collimator $a$. Only the quanta which, for example, are transmitted through channel $an$, are detected in zone $bcn$ and displayed or documented in zone $fn$. Each unit $g1$–$gn$ has a mirror-imaging effect on the signals from the detected quanta in the respective zone $bc1$–$bcn$. The principle consists of the fact that the quanta incident on point $bc10$ along line $s1$ in detector $bc$ interact there and give rise to a signal carrying position information which passes through element $g1$ in demodulator $g$, after which documentation occurs at point $f11$ of screen $f$ and not at point $f10$ as would have been the case if no demodulator had been there.

The difference between the dimension of the zone in which quanta can be documented and the dimension of the zone in which the same quanta would be documented if the resolution had been ideal can be said to be a criterion of the resolution of the scintillation camera. In order to clearly present the principle of the invention it is assumed that the resolution of the scintillation camera is ideal except for the collimator.

The quanta which are emitted from the radioactive point source $p$ to detector $bc$ are displayed or documented in zone $p2$ when they have passed demodulator $g$ and in zone $p1$ if no demodulator is present. Since zone $p2$ is smaller in its extension than zone $p1$, the resolution is increased with the use of demodulator $g$.

Figure 3:
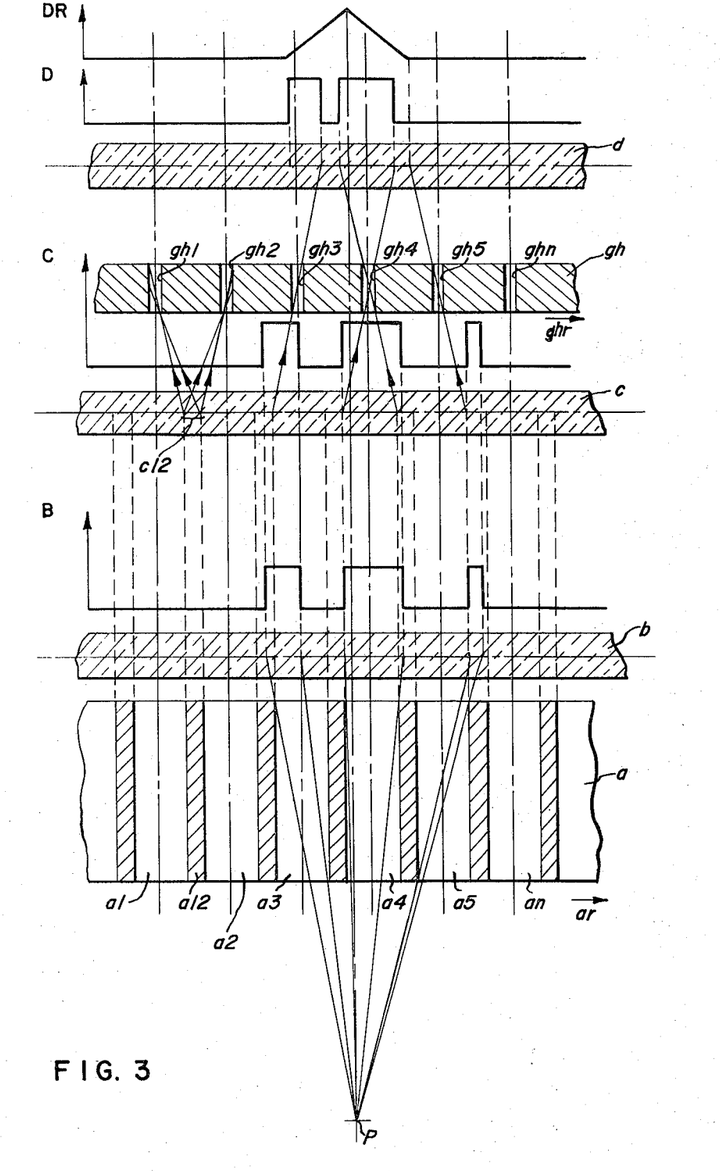
FIG. 3 is a schematic representation in cross section of portions of a scintillation camera and an optical demodulator of the "pinhole" type in accordance with this invention.

FIG. 3 shows a cross section of a version of the invention where the mirror-imaging demodulation units consist of so-called pin-holes $gh1$–$ghn$ in demodulator $gh$. Each pin-hole $gh1$–$ghn$ corresponds to its collimator channel $a1$–$an$ and is located at imaginary axes which pass coaxially through said channels $a1-an$. In order to obtain a high degree of improvement in resolution, pinholes $gh1-ghn$ are placed and dimensioned such that no signals carrying position information from the region in the display system $c$, exemplified by $c12$, corresponding to the wall or septum regions in collimator $a$, exemplified by $a12$, are capable of penetrating to screen $d$ which can serve as a documentation system. The diagram in FIG. 3 shows the detected intensity B from a radioactive point source $p$, the displayed intensity C as well as the documented intensity D of the same said source $p$.

In order to be able to map the zones which are shielded from detector $b$ by radiation quanta absorbing material between the collimator channels $a1-an$, a movement can be imparted to the collimator, as shown by arrow $ar$, which is synchronized with a movement of demodulator $gh$, as shown by arrow $ghr$, in such a manner that each zone under collimator $a$ is mapped. The distribution of the documented intensities DR in principle becomes as indicated by the diagram at the top of FIG. 3.

Figure 4:
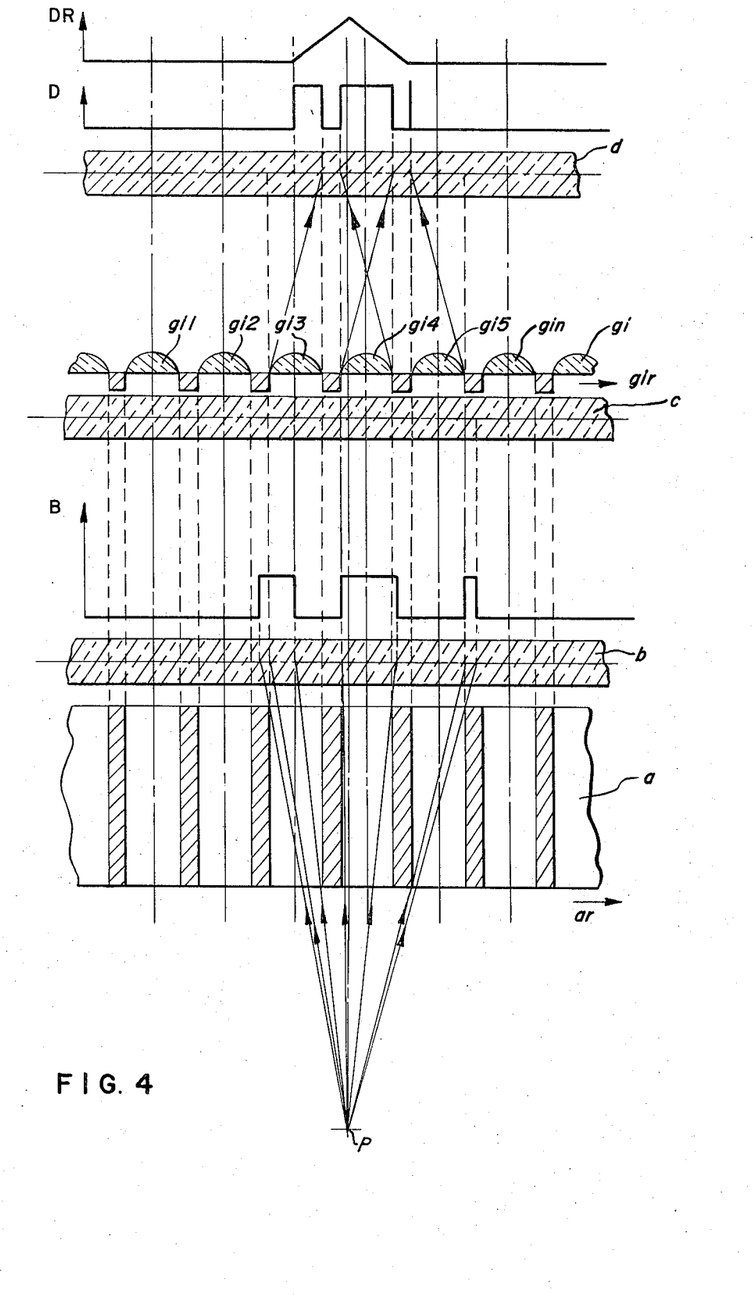
FIG. 4 is a schematic representation in cross section of portions of a scintillation camera and an optical demodulator of the lens type in accordance with this invention.

FIG. 4 shows a cross section of a version of the invention which differs from the above-cited version only insofar as the demodulator $g1$ consists of a number of lenses or lens systems $gi1-gin$ which have the same function as pin-holes $gh1-ghn$ in FIG. 3.

Figure 5:
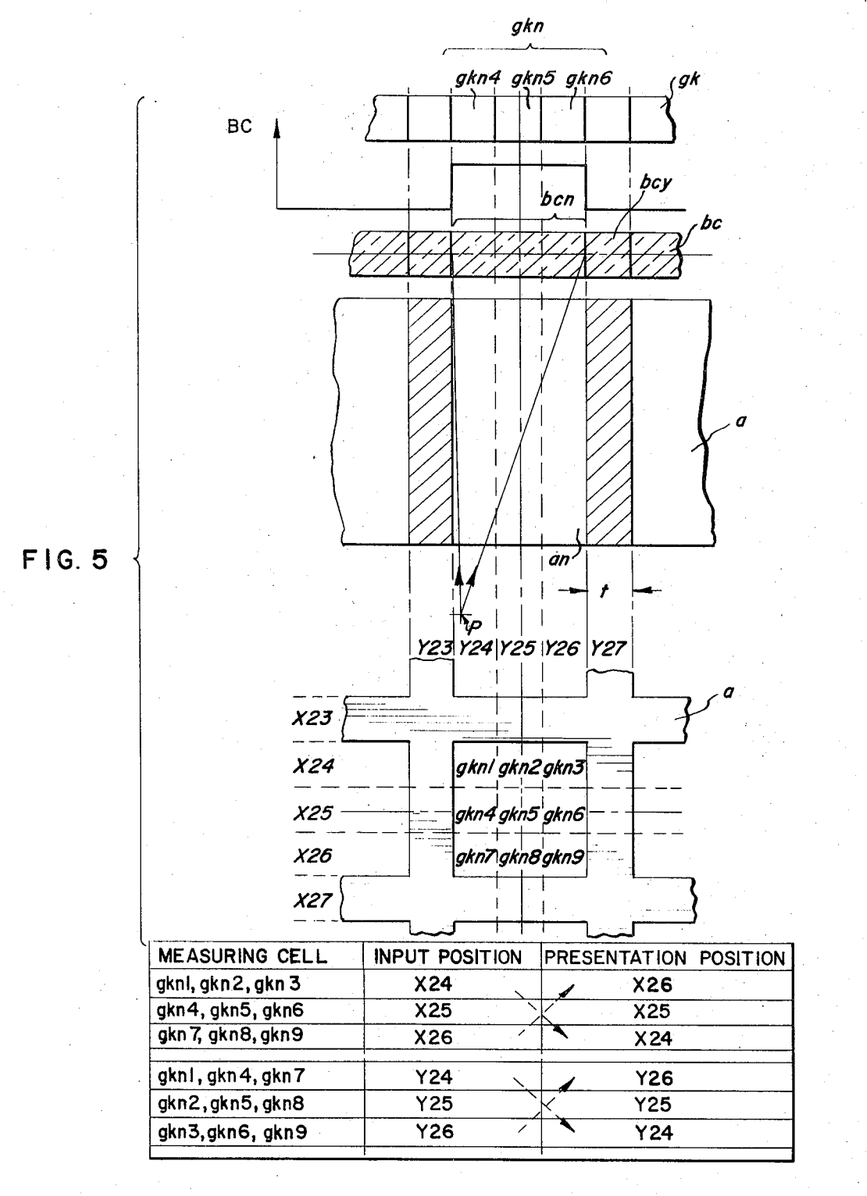
FIG. 5 is a schematic representation of the principle of this invention as it would be implemented in a data processing system.

With the use of data processing with the scintillation camera, the signals carrying position information are stored in some data memory where the signals carrying position information from a given zone in the detector are stored in a data memory corresponding to said zone, a so-called measuring cell. As indicated by FIG. 5, the detected and displayed intensity BC of the radioactive point source $p$ will be stored in data memory $gk$. In order to make full use of the idea of the invention, a certain integral number of measuring cells in zone $gkn$, hereinafter called cell group, in data memory $gk$ is assigned to each zone $bcn$ in detector $bc$ on which quanta of radiation are incident through collimator channel $an$ associated with zone $bcn$. In FIG. 5, measuring cell $gkn1$ in the data memory $gk$ corresponds to zone $bcn1$ in detector $bc$, $gkn2$ to $bcn2$, etc. The part in the detector which corresponds in cross section to a wall with thickness $t$ between two collimator channels $bcy$ in collimator $a$ can be allowed to have such a space in the data memory $gk$ which in cross section corresponds to one or a certain number of measuring cells. In the case of storage of signals carrying position information the measuring cells put certain information into a matrix with rows $x1-xn$ and columns $y1-yn$. For example, measuring cell $gkn1$ is assigned position $x24/y24$ in said matrix. The mirror-imaging process is performed such that the content in each measuring cell, except for a possibly centrally located measuring cell in the group, e.g. $gkn5$, is exchanged for the information content in a diametrically opposite measuring cell according to the diagram shown in FIG. 5. Consequently, the information stored in $gkn1$, i.e. the number of signals carrying position information, will be presented as $x26/y26$.

A multichannel collimator intended to be utilized with this invention can be designed such that it offers an improved resolution in the detection of lower photon energies with unmodified sensitivity. The number of collimators in one and the same scintillation camera can therefore be reduced.

It should be apparent from the above description that this invention is based upon the recognition that radiation quanta from a point source underneath a particular main collimator channel will uniformly illuminate a small zone of the detecting transducer associated with that collimator channel but will only illuminate a portion of a small zone of the detecting transducer associated with the adjacent channels. The portions illuminated through adjacent collimater channels are the ones most remote from the position of the point source so that, if a mirror-image reversal around the axis of each collimator channel is performed, the output signal documented is closer to the position of origin of the quantum of radiation which produced by it. At the same time the image from the main collimator channel is reversed but since the illumination is uniform, there is no alteration of that image information.

Figure 6:
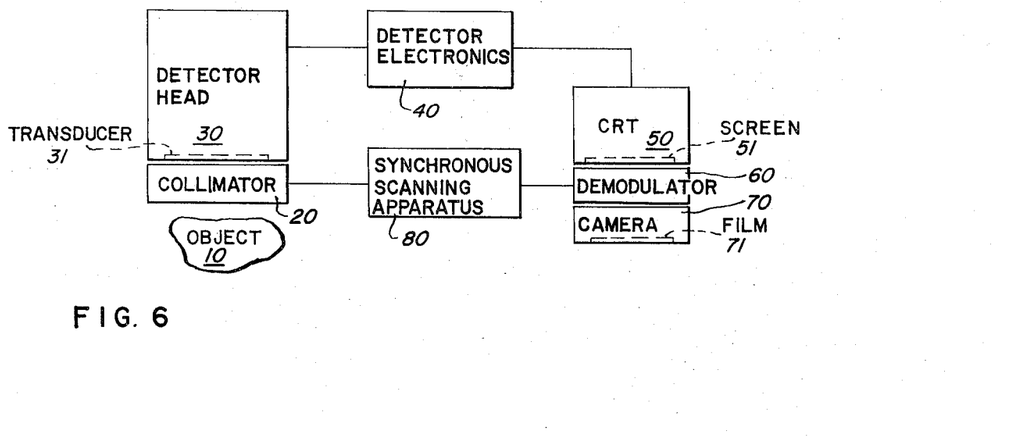
FIG. 6 is a block diagram of a scintillation camera system employing an optical demodulator in accordance with this invention.

FIG. 6 shows a block diagram of a scintillation camera system employing an optical demodulator version of this invention. Radiation quanta from object 10 traverse collimator 20 (denoted $a$ in FIGS. 1–5) and interact with a radiation sensitive transducer 31 (denoted $b$ in FIGS. 1–4) in detector head 30. Detector head 30 and detector electronics 40 together produce output electrical signals containing position coordinate information which is fed to CRT 50 such that the spatial position of an interaction in transducer 31 is imaged as a correspondingly positioned flash of light on CRT screen 51 (denoted $c$ in FIGS. 1–4). Light flashes on CRT screen 51 pass through optical demodulator 60, which may be the array of pinhole demodulating elements $gh1-ghn$ of FIG. 3 or the lens elements $gi1-gin$ of FIG. 4, and are documented on a documentation medium such as film 71 (denoted $d$ in FIGS. 1–4) in camera 70. A synchronous scanning apparatus 80 produces synchronous scanning of collimator 20 and demodulator 60.

Figure 7:
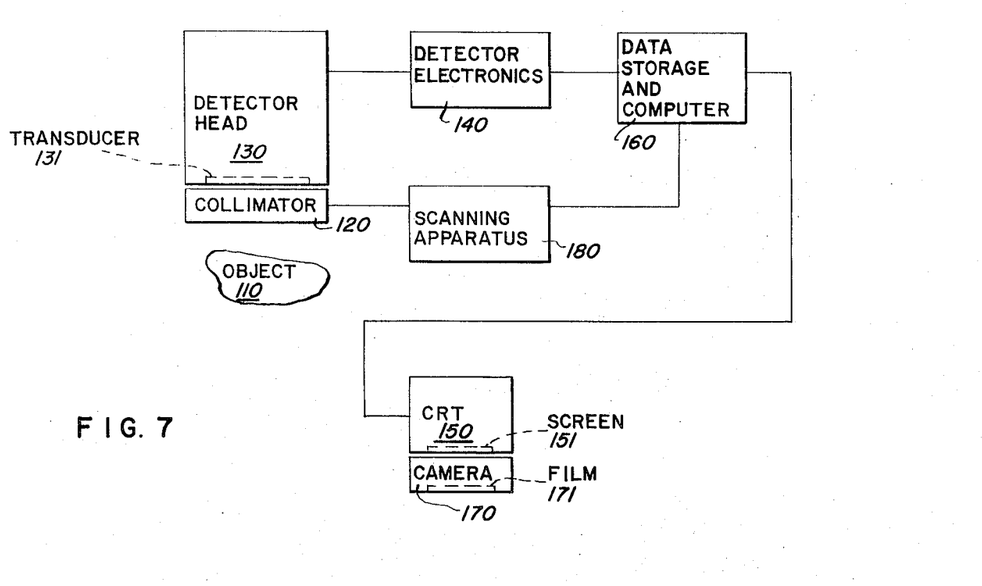
FIG. 7 is a block diagram of a scintillation camera system employing an electronic demodulator in accordance with this invention.

FIG. 7 shows a block diagram of a scintillation camera system employing an electronic demodulation version of this invention. In this version position coordinate output signals from detector electronics 140 are stored in data storage and computer apparatus 160 in which the stored image information is processed digitally to produce the required mirror image reversal around the position of the axis of each collimator channel. In this embodiment the mirror image reversal is performed before display on screen 151 of CRT 150 and documentation on film 171 in camera 170; and scanning apparatus 180 produces scanning of collimator 120 and provides collimator position signals to data storage and computer apparatus 160.

It should be apparent the embodiments of this invention described above are for purposes of illustrating the general characteristics of this invention and numerous modifications could be made without departing from the scope of the invention as claimed in the following claims.

I claim:

1. In combination:
   a radiation detector, including a radiation sensitive transducer, of the type producing an output representing spatial coordinates of interaction of a quantum of radiation with said transducer;
   a collimator mounted on said detector adjacent said transducer comprising a regular array of separated channels for radiation quanta;
   a documentation medium; and demodulation means receiving said output of said detector operative to produce on said documentation medium a documenting spot at a position comprising a mirror image reversal of said spatial coordinates of interaction with respect to a central axis of one of said channels traversed by said quantum of radiation.

2. The combination as claimed in claim 1, wherein said collimator is movably mounted on said detector; and further comprising scanning means for producing synchronous scanning of said collimator and said demodulation means.

3. The combination as claimed in claim 1, wherein said radiation detector further includes a CRT display means and said output comprises a spatially located flash of light on said CRT display means; said documentation means comprises a sheet of photographic film; and said demodulation means comprises optical demodulation means mounted between said CRT display means and said photographic film and having an array of demodulation elements corresponding to said array of separated channels of said collimator and positioned with respect to said CRT display means such that spatial coordinates of a central axis of each of said demodulation elements correspond to spatial coordinates of a central axis of an associated channel.

4. The combination as claimed in claim 3, wherein each of said demodulation elements comprises a pinhole aperture in a light opaque medium.

5. The combination as claimed in claim 3 wherein each of said demodulation elements comprises an individual lens mounted in an optical collimator channel.

6. The combination as claimed in claim 1, wherein said output of said radiation detector comprises a pair of coordinate electrical signals; and said demodulation means comprises data storage and computing means receiving said coordinate electrical signals operative to translate said signals into demodulated electrical signals and display means for displaying said demodulated electrical signals.

* * * * *